No. 730,655. PATENTED JUNE 9, 1903.
J. W. HORNSEY.
HOT AIR FURNACE.
APPLICATION FILED APR. 17, 1902.
NO MODEL. 3 SHEETS—SHEET 1.
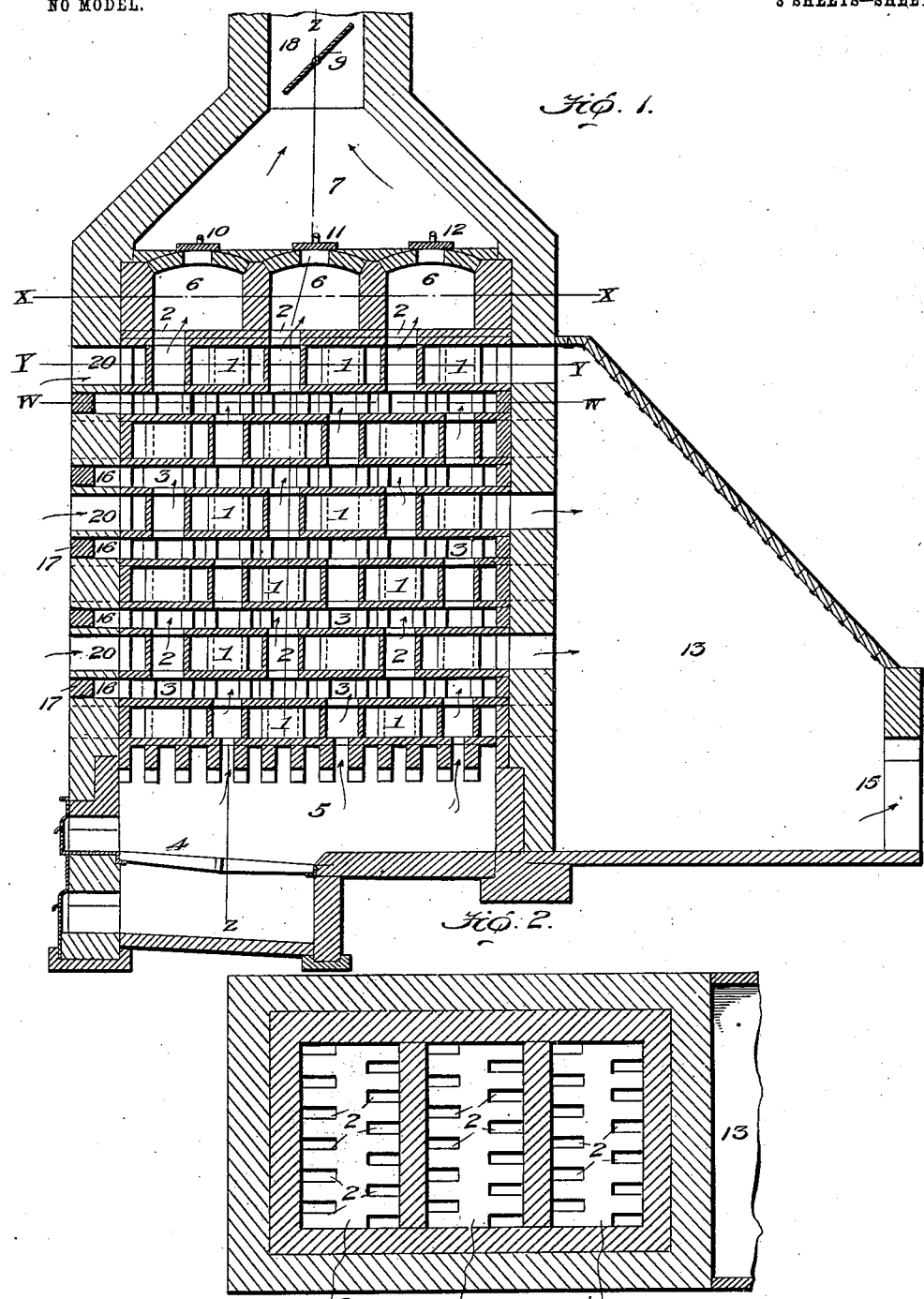

No. 730,655. PATENTED JUNE 9, 1903.
J. W. HORNSEY.
HOT AIR FURNACE.
APPLICATION FILED APR. 17, 1902.
NO MODEL. 3 SHEETS—SHEET 2.
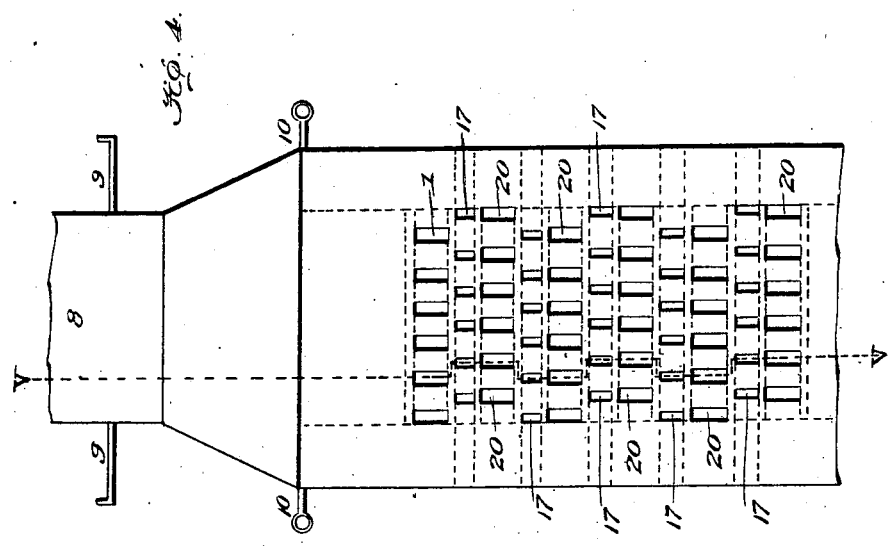
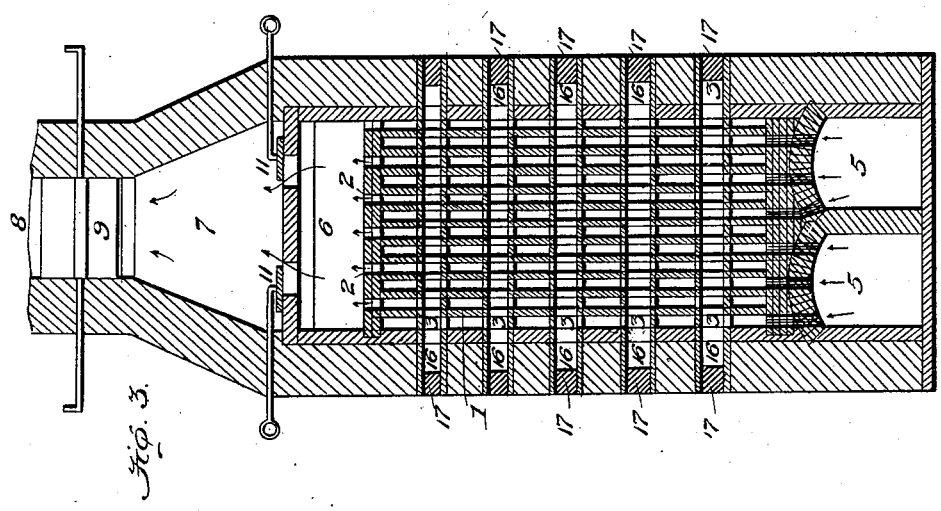
Witnesses: Inventor No. 730,655. PATENTED JUNE 9, 1903.
J. W. HORNSEY.
HOT AIR FURNACE.
APPLICATION FILED APR. 17, 1902.
NO MODEL. 3 SHEETS—SHEET 3.

No. 730,655. Patented June 9, 1903.

UNITED STATES PATENT OFFICE.

JOHN W. HORNSEY, OF CLEVELAND, OHIO.

HOT-AIR FURNACE.

SPECIFICATION forming part of Letters Patent No. 730,655, dated June 9, 1903.

Application filed April 17, 1902. Serial No. 103,329. (No model.)

*To all whom it may concern:*

Be it known that I, JOHN W. HORNSEY, a citizen of the United States of America, residing at the city of Cleveland, in the county of Cuyahoga and State of Ohio, have invented certain new and useful Improvements in Hot-Air Furnaces, of which the following is a specification.

My present invention, which relates to hot-air furnaces, contemplates certain improvements in the type of furnace patented to me May 7, 1901, No. 673,397, the said improvement having for its object the simplification of the furnace structure, together with increased efficiency and economy of space in the installation for drying and for heating.

Figure 5:
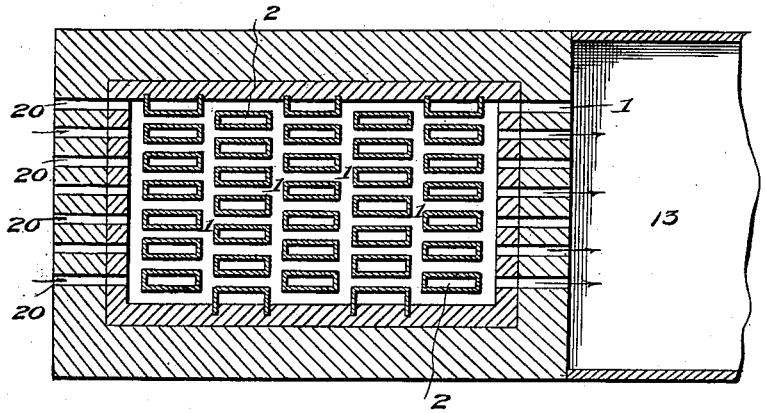
Figure 6:
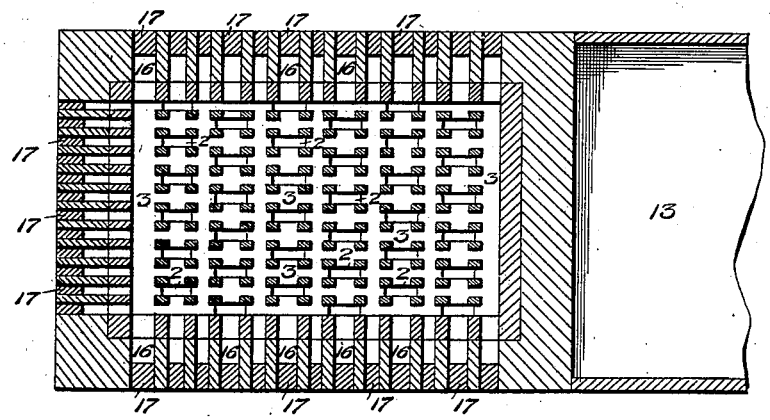

The accompanying drawings represent in Figure 1 a vertical section of a hot-air furnace embodying my present improvement, of a plurality of heat-diffusion chambers in direct controllable communication with a controllable stack, and the flue structure to render the heat of the latter more uniform, the section being taken on the dotted line V V of Fig. 4 to show that the air-flues and the fire-spaces open at the air-inlet side of the furnace-wall and that the openings 16 of the fire-spaces are closed by plugs 17. Fig. 2 is a horizontal section on the line X of Fig. 1, showing a plurality of heat-diffusing valve-controlled chambers supplementing the fire-flues of the heat-storage flue structure. Fig. 3 is a vertical section on the line Z of Fig. 1, showing one of the heat-controllable chambers in direct communication with the stack, the line of section showing particularly the plugged openings 16 of the fire-spaces in the opposite walls, as in Fig. 6. Fig. 4 shows in elevation the arrangement of the wall-openings for the admission of air into the heat-storage structure and the arrangement of the wall-openings for cleaning the fire-spaces. Fig. 5 is a like section taken through one of the horizontal circuitous air-passages on the line Y of Fig. 1, showing in section the vertical fire-flues. Fig. 6 is a like section taken through one of the horizontal fire-spaces on the line W of Fig. 1, showing the provision for cleaning the fire-spaces.

The heat-storage structure is of fire-resisting material, within which air-passages 1 are formed by slabs arranged in horizontal tiers separated and supported by staggered walls forming vertical fire-flues 2, the walls of which pass successively through the tiers of the air-passages.

Fire-spaces 3 are formed by and between the horizontal slabs, and into these fire-spaces the vertical fire-flues successively open through the tiers of slabs, whereby the fire-flues heat the air by radiation and form a heat-storage structure or reservoir wherein and through certain passages 1 of which air is caused to constantly pass in comparatively thin volumes independently of and crossing the flues for the products of combustion, the air in its passage extracting the heat radiated from the walls. In this construction of separate and independent passages and flues, the latter for the products of combustion and the passages for the air in thin volumes in contact with and between flue-walls, the heat is maintained at a high temperature and the air is rendered absolutely pure and of a high moisture-absorbing capacity. In the construction shown the fire-box 4, which may be adapted for grate-fire, is preferably located directly beneath the heat-storage flue structure, so that the fire-flues of the latter open directly into the fire-box chamber 5 for an updraft. The heat-storage structure is supplemented by a plurality of valve-controlled chambers 6 and which are supplemented by a chamber 7, the walls of which rise from the closure-walls of the flue structure and converge in a stack 8, provided with a controlling-damper 9, whereby in operating conjointly these valved chambers the products of combustion are caused to be diffused through the circuitous fire-flues, and thereby effect a more uniform combustion of the fire products in the perfect diffusion of the heat through the staggered flues. To secure perfect combustion, high temperature, proper areas, a proper amount of air for combustion, and a complete commingling of the products of combustion and the air supplied for combustion are necessary. Such perfect combustion is obtained to the fullest extent in the heat-storage structure, through which the products of combustion are caused to pass from the furnace through a multiple of vertical flues, which open into the successive horizontal intersecting spaces 3, which are common to all the products and within which they are commingled. The walls of these successive fire-spaces form also the walls of the successive air-passages, and the fire products pass into the shallow fire-spaces toward the exits and into the plurality of chambers 6, which supplement the exits and have direct communication with the chamber 7, having direct communication with the valve-controlled stack. As shown, this stack-chamber is of conical form, and by adjusting the damper in the stack the products of combustion may be controlled, retarded, and retained within the chamber, while by adjusting some and closing some of the valves of the heat-diffusion chambers the draft can be advantageously diffused and regulated through all the flues. Each of these chambers is preferably provided with a pair of valves 10, 11, and 12, and the number of the chambers will be governed by the size of the furnace; but to obtain the best controlling effect of the single stack-draft it should stand centrally with the plurality of the diffusion-chambers which supplement the fire-flues.

In operation it might be found that the products of combustion would have greater tendency to rise through that part of the structure nearest the fire-box, which, as shown, is beneath the valved exit 10, and in this case the fire products could be spread through all the flues of the structure by closing said valves 10 of the side chamber, partially opening the valves 11 of the middle chamber, and, if necessary, entirely closing the valves 12 of the other side chamber, in which case the central draft will be effective in maintaining a uniform heat in the flue structure.

Referring to Fig. 1, it will be seen that the air-passages are open at both the closure-walls and that one of said walls is inclosed, so that all these passages open into this closure, which is thereby made a hot-air-storage chamber 13, from which air is supplied for drying or for heating and may be drawn therefrom by a suction-fan placed in an opening at 15 and which also draws the air through the staggered passages of the heat-storage structure.

I have stated that the furnace can be operated continuously; but this advantage can only be rendered possible by provision whereby certain of the flues may be kept from choking. In operating the furnace I have found that the vertical staggered fire-flues 2 are self-cleaning and that the horizontal fire-spaces 3 between the slabs become filled with ashes and stop the draft of the furnace. These fire-spaces are formed by blocks arranged in parallel rows, so as to form spaces unobstructed across the furnace in two directions, as in Fig. 6, which separate and support the slabs, and between these rows of blocks the fire-flues open in staggered relation between the slabs. The fire products, therefore, as they pass from the vertical flues impinge against the slabs above, as in Fig. 1, and are deflected horizontally, and it is this interruption of the direction of the fire products which causes the deposit of ashes within the fire-spaces between the flue-openings. I therefore provide access to these fire-spaces by openings 16 in the closure-walls leading from and coincident with the spaces between the rows of blocks and with the flue-openings. This arrangement of the blocks in their relation to the rows of flue-openings gives a clear way for introducing a scraper through the closure-wall openings and through the fire-spaces across the fire-flue openings to cause the collected ashes to be pushed and scraped in two directions between the rows of blocks over the flue-openings through which the ashes fall successively from one fire-space to the other and finally into a chamber common to all the flues. The wall-openings are provided with suitable closures, as plugs or brick 17, temporarily set in, and can be removed when the fire-spaces are to be cleaned. The outside wall-openings 20 of the air-passages may be closed by bricks or otherwise, so that a greater or less number may be used to diminish the inlet area of the openings, and by this means the temperature of the air may be regulated.

In Fig. 6 are seen the horizontal straight passages for the products of combustion leading through the furnace-walls and intersecting the vertical flues for the products of combustion, whereby the ash deposits in these straight passages may be dislodged and carried to and through the vertical flues successively from one straight passage to another, the dislodgment being made in lines at right angles to each other between the rows of blocks and from opposite sides of the closure-walls.

While I have shown the vertically-staggered fire-flues opening directly into the chamber of the fire-box, obviously the fire-box may be arranged outside of the flue structure; nor do I wish to be confined to the described direction of the draft.

I claim—

In an air-heating furnace, a fire-box, a fire-brick structure, a plurality of flues having communication with a fire-chamber, circuitous passages for air independent of and crossing the flues for the products of combustion, a plurality of valve-controlled chambers for diffusing the products of combustion through the flues of fire-brick structure, and a valve-controlled stack into which the valve-controlled chambers commonly discharge.

In testimony whereof I affix my signature in presence of two witnesses.

JOHN W. HORNSEY.

Witnesses:
A. E. H. JOHNSON,
GUY H. JOHNSON.